United States Patent [19]
Habert

[11] 3,888,720
[45] June 10, 1975

[54] TIRE BUILDING MACHINE HAVING A VARIABLE DIAMETER TIRE BUILDING DRUM

[75] Inventor: William C. Habert, Fraser, Mich.

[73] Assignee: Uniroyal, Inc., New York, N.Y.

[22] Filed: Feb. 5, 1973

[21] Appl. No.: 329,786

[52] U.S. Cl. .............. 156/414; 156/128 I; 156/133; 156/396; 156/405; 156/406; 156/417
[51] Int. Cl. ............................................ B29h 17/16
[58] Field of Search ............ 156/110, 123, 126–129, 156/133, 394, 396, 405, 406, 414–420, 398, 400–403, 350, 351

[56] References Cited
UNITED STATES PATENTS

| | | | |
|---|---|---|---|
| 1,679,560 | 8/1928 | Burdette | 264/291 |
| 1,964,363 | 6/1934 | Ostling et al. | 156/403 |
| 3,140,216 | 7/1964 | Shilts et al. | 156/415 |
| 3,374,138 | 3/1968 | Porter et al. | 156/417 |
| 3,405,023 | 10/1968 | Eckenwiler et al. | 156/415 |
| 3,591,439 | 7/1971 | Leblond et al. | 156/406 |
| 3,595,724 | 7/1971 | Leblond | 156/408 |
| 3,684,877 | 8/1972 | Homa et al. | 156/401 |
| 3,740,293 | 6/1973 | Jones et al. | 156/401 |

FOREIGN PATENTS OR APPLICATIONS

| | | | |
|---|---|---|---|
| 983,349 | 2/1965 | United Kingdom | 156/414 |

Primary Examiner—Clifton B. Cosby
Assistant Examiner—John E. Kittle
Attorney, Agent, or Firm—Jay L. Chaskin, Esq.

[57] ABSTRACT

A tire building drum having a circumferential periphery formed by a plurality of arcuate segments which are radially movable with respect to the axis of the drum. Radial expansion and contraction is provided by a drive shaft actuating a cam plate having a spiral groove. Extending from each segment is a cam follower which engages the spiral groove. Rotation of the drive shaft causes the cam follower to be guided within the groove. The drum may be rotated independently without effecting radial movement of the segments. Radial positioning of the segments can be selected by a digital control to the shaft actuating means. The drum may be used to fabricate breaker-tread assemblies for tire of different sizes by the selection of the desired diametric dimension.

32 Claims, 8 Drawing Figures

TIRE BUILDING MACHINE HAVING A VARIABLE DIAMETER TIRE BUILDING DRUM

BACKGROUND OF THE INVENTION

This invention relates to an improved tire building machine, and, more particularly to a tire building machine having an improved breaker building drum.

In tires having breakers or belts incorporated in the crown area, it is conventional to use a two-stage process for the building of, for example, a radial ply tire. During the first stage of tire building, a cylindrical carcass is formed having one or more elastormeric cord reinforced plies or layers wound around and interconnecting axially spaced, parallel, coaxial, bead rings. Further, during the first stage, as layer of elastomeric sidewall stock is applied on each sidewall area of the carcass, intermediate the eventual crown region and the two bead rings. In addition, during the building of the "first stage carcass," a breaker is formed on a building drum from one or more elastomeric cord reinforced plies or layers and the breaker and tread are assembled together. In the second stage of tire building, the shape of the first stage is changed from a cylinder to a toroid and the breaker-tread assembly is applied to the now-formed crown region of the shaped carcass. The completed carcass-breaker-tread assembly is thereafter into a finished tire during vulcanization in a tire mold.

In known tire building machines intended to manufacture tires according to the first and second stage process described above, such as U.S. Pat. No. 3,591,439, LeBlond et al., the breaker is formed by successively winding one or more plies about a radially expansible and contractible auxiliary building drum. The tread is thereafter applied to the fabricated breaker and the breaker-tread assembly is then removed from the auxiliary building drum by a transfer ring. The transfer ring thereafter applies the breaker-tread assembly to the carcass during toroidal shaping.

The breaker building, according to the known machines however, requires an operator to manually position, adjust or manipulate the plies forming the breaker and to otherwise semi-automatically radially position the building drum during breaker fabrication. A further significant limitation in the usefulness and efficiency of such known tire building machines is an inability to build tires of different sizes. The known breaker building drums which are radially expandable and contractible over a substantial range, however, require an operator to manually position precisely the periphery of each breaker ply application wheel relative to the drum periphery when the breaker building drum size is varied.

It is therefore an object of the present invention to provide an improved tire building machine which can fabricate tires of different sizes.

It is a further object of the present invention to provide a tire breaker building drum whose diametric dimensions can be varied so as to fabricate a breaker-tread assembly for tire carcasses of different sizes.

It is still a further object of the present invention to provide a tire building machine and a breaker building drum which can be automatically precisely adjusted to fabricate a breaker for carcasses of different diametric sizes.

SUMMARY OF THE INVENTION

In accordance with one embodiment of this invention, a tire building machine is provided with (1) a pair of supply means for supplying a pair of cord-reinforced continuous strips of bias-cut breaker material which may have the same or different physical characteristics and wherein the cords may be similarly or oppositely oriented with respect to each other; (2) severing means for severing strip portions from each of the continuous strips of breaker material; (3) a pair of spaced breaker applicator wheels for applying the severed strip portions to a single expansible, collapsible, breaker building drum, the latter being shiftable along a fixed axis between a first position in which it is in registry with the first of said breaker applicator wheels, a second position in which it is in registry with the second breaker applicator wheel, and both a third and a fourth position in which it is spaced from both of the wheels; (4) a tread applicator means at said third position for applying a strip of tread material to a breaker assembly built up on the breaker building drum; and (5) a transfer ring cooperable with the breaker building drum when the latter is in the fourth position thereof for transferring a completed breaker-tread assembly from the building drum onto a first-stage carcass supported on a carcass support means.

Preferably, the axis of the carcass support means is at an angle with respect to the fixed axis of the building drum. The transfer ring is supported for pivotal movement between a first angular position in which it is coaxial with said fixed axis and a second angular position in which it is coaxial with said fixed axis and a second angular position in which it is coaxial with said carcass support means. The transfer ring is also shiftable on said pivot means along its own axis for removing the completed breaker-tread assembly from the drum and shifting the assembly into association with the carcass.

The machine furthermore may include an electrical digital control system for selectively effecting an expansion or collapsing of the breaker building drum to permit building of different size breaker-tread assemblies thereon, and for effecting a corresponding amount of radial shifting of the applicator wheels relative to the drum so that the periphery of each wheel is in operative registry with each drum position. The digital control system also governs the rotation of the wheels and drum to effect transferring of a breaker cut-to-length from each wheel to the drum.

The breaker building drum includes a drive shaft coaxial with the fixed axis of the drum. The drive shaft can be rotatably actuated to rotate the drum so as to fabricate the breaker and trend assembly. The drive shaft can be further rotatably actuated so as to independently radially expand or contract the diametric dimension of the drum. Radial expansion and contraction of the drum is provided by a cam means rotatably actuated by the drive shaft. The cam means includes a cam plate having a spiral groove. The circumferential periphery of the drum is formed by a plurality of arcuate segments, which segments are radially movable with respect to the fixed axis. Extending from each segment is a cam follower which engages the spiral groove. Rotation of the drive shaft causes each cam follower to be guided within the spiral groove and thereby radially expand or contract each of the segments simultaneously.

BRIEF DESCRIPTION OF THE DRAWINGS

While the specification concludes with claims particularly pointing out and distinctly claiming the subject matter regarding this invention, it is believed that the invention will be better understood from the following description, taken in conjunction with the accompanying drawings in which:

FIG. 3 is a side or end view of the portion of the tire building machine shown in FIG. 2, where certain features have been partially cross-sectioned for clarity of illustration;

DESCRIPTION OF THE PREFERRED EMBODIMENT

Figure 1:
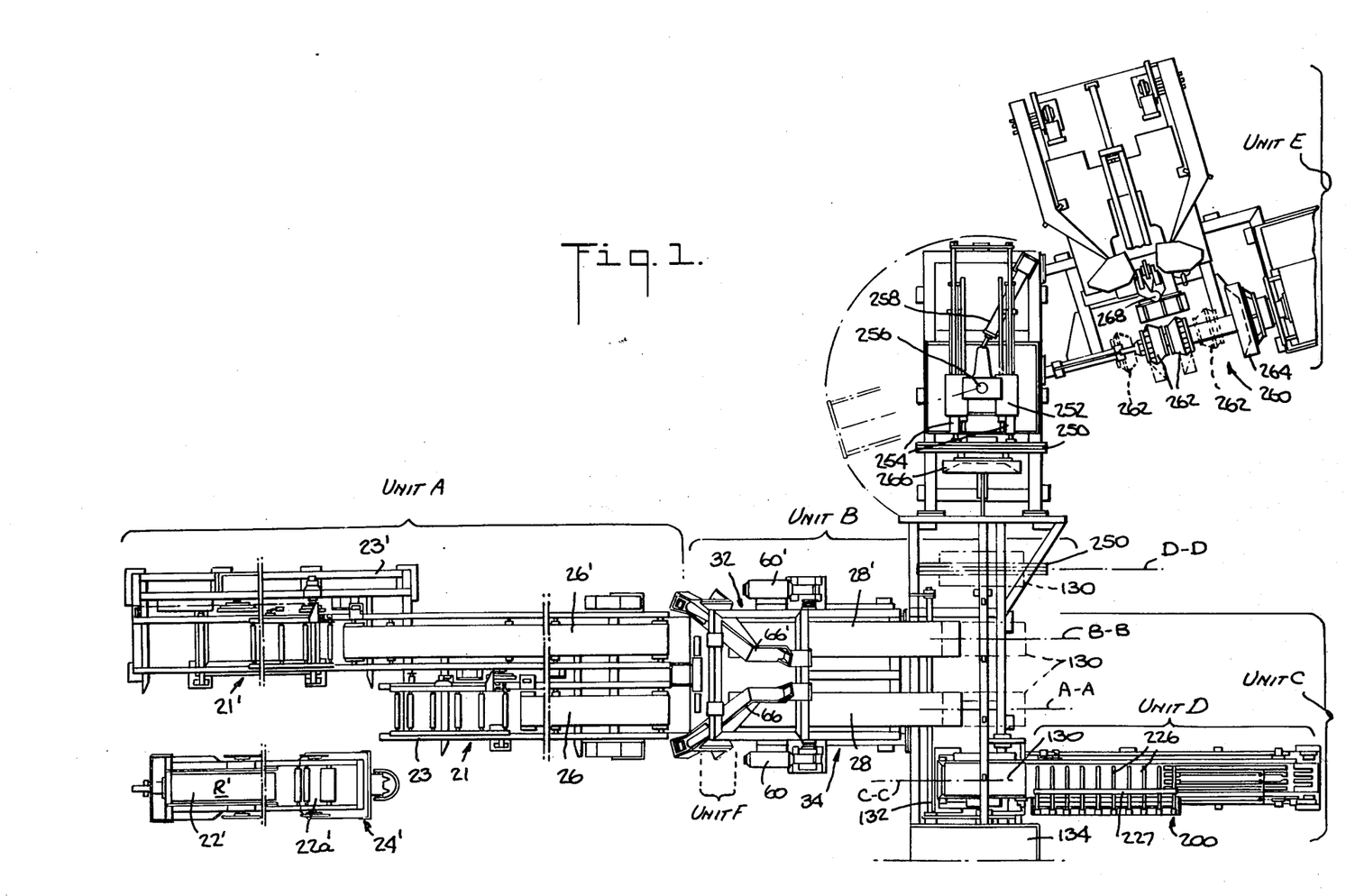
FIG. 1 is a schematically illustrated top plan view of the tire building machine according to the present invention.

Referring to FIG. 1, the apparatus according to the present invention includes a unit "A" comprising a pair of supply units 21 and 21' for supplying a pair of continuous strips of preferably magnetically attractable (steel-reinforced) breaker material. The strips which are wound on respective spools, such as spool 22', may have different widths, and possibly the inclinations of their cords with respect to their longitudinal axes may be different. For obvious convenience of reloading, initial winding of the continuous strips on the spools is effected in the same direction on the different spools. Thus, even though it may ultimately be desired to have the strips oriented in opposite directions, the initial winding of the strip material onto their respective spools is done in the same direction, i.e., with respect to those spools, so that as far as the winding operation is concerned the cords of the breaker strips always have the same orientation, irrespective of which of the spools is being wound.

The strip supply units 21 and 21' are each preferably of the type described in U.S. Pat. No. 3,498,555 to J. Leblond et al., dated Mar. 3, 1970. As described in the aforesaid patent, the supply units 21 and 21' each include an unwinding station defined by stationary frames 23 and 23' on which the drive and control elements of the respective unit is mounted, and with which a movable dolly, such as the dolly 24' is associated. On each of the dollies there is mounted the respective breaker strip supply spool, such as the spool 22', and respective liner takeup spools, such as the spool 22a'. While the liner material which separates adjacent convolutions of the breaker material on the supply spools is wound on the liner take-up spools, the continuous strips of breaker material may be fed to a pair of transport mechanism preferably comprising a pair of parallelly arranged endless belt conveyors, respectively, 26 and 26' of well known type, the said strip materials resting on the upper runs of the endless belts so as to be transported thereby. When, as in the usual case, it is desired to have the breaker assemblies built up of successive plies whose cords form a crossing angle with respect to each other, the otherwise identical movable dollies such as the dolly 24' are reversed with respect to each other so that the breaker strips are unwound in opposite directions.

It will thus be seen that the strips wound on the supply spools whose median planes A—A and B—B are parallel, are each unwound by the action of the belt conveyors 26 and 26', respective. The conveyors 26 and 26' deliver the continuous strips to a strip processing unit "B" comprising a pair of applicator units (wheels) 28 and 28' which fabricate breaker plies, orient the breaker plies in desired fashion, and transfer the oriented breaker plies to a breaker building unit "C".

The breaker applicator wheels 28 and 28' are preferabaly of the type described in copending U.S. Pat. application Ser. No. 329,974, filed in the name of William C. Habert et al. on Feb. 5, 1973. The breaker applicator wheels employ fabric lift-off magnets and have tire adjustment features, including, (1) electrical circuits for repositioning the breaker fabric-cut-to-length stop position; (2) means to resynchronize the respective breaker applicator wheel and building drum speeds upon changing the diameter of the breaker building drum; and (3) means to automatically reposition the breaker applicator wheel relative to the breaker building drum when the diameter of the breaker building drum is changed.

Adjacent the downstream end of the conveyors 26 and 26' there is preferably located a breaker strip centering device (Unit "F") such as, for example, the one described in U.S. Pat. No. 3,537,936 to J. Leblond, dated Nov. 3, 1970. Typically the centering units described in U.S. Pat. 3537936 includes a first pair of endless belts forming a generally horizontal, moving support for supporting the respective material as it passes through the device, and a second pair of driven endless belts forming vertical, horizontally spaced, moving surfaces for contacting and guiding the side edges of the strip material as it passes through the device so as to maintain the continuous strips in registry with their respective medial planes. The belts, however, whether they be of the above type or of any other conventional type, such as that disclosed in U.S. Pat. No. 3,547,286, dated Dec. 15, 1970, to J. Leblond.

The breaker fabricating and transfer Unit B comprises the aforementioned pair of wheels 28 and 28'. Each of the wheels 28 and 28' is provided with a breaker strip support anvil or band which overlies the periphery of each of the wheels over an arcuate extent of approximately 180°. Each of the wheels 28 and 28' is rotatably mounted upon a common frame 32 having an upper movable frame segment and a lower stationary frame segment relative to which the upper movable frame segment may be shifted.

Each of the wheels 28 and 28' are substantially identical and provided with apertinances which are likewise substantially identical to one another. The wheels 28 and 28' may be adjustably moved out of axial alignment with one another when necessary.

Mounted upon the upper movable frame segment 34 is a motor unit 60 which by conventional means (not shown) acts to rotatably drive a gear means connected to wheel 28. A similar assembly is provided for the wheel 28'. Thus, each of the wheels 28 and 28' may be rotated relative to the frame 32 independently of one another.

Mounted atop of the upper frame segment 34 are a pair of auxiliary frame portions 66 and 66'. Each of the auxiliary frame portions 66 and 66' carries a respective strip severing means in which is associated with the wheel 28. Each strip severing means may be of the type, for example, disclosed in U.S. Pat. No. 3,591,439, dated July 6, 1971, to J. Leblond et al., or more preferably of the type disclosed in U.S. Pat. No. 3,732,767, issued May 15, 1973, to W. C. Habert. The strip severing means generally comprises a pair of carriage sections which are slidingly supported for movement toward and away from one another along an arcuate track having a radius of curvature which is complimental to the radius of curvature of the wheel 28. The carriage sections are movable relative to the wheel 28 in a direction parallel to the endwise extent of the oblique auxiliary frame portion 66, and are provided with blades which may be protracted and retracted into and out of contact with the wheel anvil for severing a breaker strip in an oblique direction corresponding to the obliquity or angle of bias of the steel cords within the breaker strip.

As shown in FIG. 1, adjacent the wheels 28 and 28' of the strip processing Unit B is disposed a breaker-tread assembly building Unit C. Unit C comprises a tread application Unit D and an axial movable radially expandible and contractible building down 130 and an axial drive assembly 134 and an index drive assembly 135, to be described in greater detail hereafter. The tread application Unit D comprises an applicator 200 disposed along the plane denoted by the line C—C in FIG. 1. The tread applicator 200 includes a horizontal frame which is pivotably arranged at one end thereof and a plurality of horizontally spaced endless belts. The endless belts provide means for advancing a tread toward the breaker-building drum 130 when the drum 130 is located in the position designated as line C—C. The tread applicator 200 includes means for selectively stretching or contracting the lengthwise extent of the tread so as to conform to the circumferential periphery of the breaker built upon drum 130. Upon actuation of suitable lifting means, the tread applicator 200 is pivoted such that the leading edge of the tread is brought into contact with drum 130. The forward movement of the tread, as generated by the moving endless belts, effects rotation of drum 130 as the tread is wound upon the drum. The tread applicator Unit D is preferably of the type described in copending U.S. Pat. application Ser. No. 325,693 filed on Jan. 22, 1973 in the name of William C. Habert et al. During tread application, the drum index drive assembly 135 is decoupled from the drum 130 in order to permit the drum to freely rotate about a support shaft. Once the tread has been wound upon the breaker assembly previously fabricated on the drum 130, the drum 130 is then shifted axially by drive assembly 134 from the position denoted by the line C—C in FIG. 1 to a position denoted by the line D—D in FIG. 1. Line D—D corresponds to a breaker-tread assembly transfer position which is accomplished by a first stage carcass Unit E.

Referring to FIG. 1, there is illustrated a first stage carcass assembly unit of the type disclosed, for example, in U.S. Pat. No. 3,676,262 to J. Leblond, dated July 11, 1972. The unit E includes a transfer ring 250 having a radially expansible, contractable, internal effective periphery (not shown) which when fully expanded is of greater circumference than the breaker-tread assembly wound upon the drum 130, and when contracted will engage the breaker-tread assembly wound upon the drum 130 to remove and transfer the breaker-tread assembly to and around a first stage carcass. The transfer ring preferably is of the type disclosed in copending U.S. Pat. application Ser. No. 319,354, filed on Dec. 29, 1972 in the name of William C. Habert.

In this respect, the transfer ring 250 is mounted upon a turret 252 which when in a position as illustrated in solid line in FIG. 1 maintains the transfer ring 250 in coaxial alignment with that of the drum 130. When the drum 130 supplied with the breaker-tread assembly is shifted to a position illustrated in FIG. 1 and denoted by the line D—D, the transfer ring 250, in its expanded condition, is shifted axially from the position illustrated in solid line to that of the position illustrated in phantom corresponding to the line D—D in FIG. 1 so as to surround the breaker-tread assembly. Axial shifting of the transfer ring 250 is effected such as by means of the power cylinders of jacks 254.

When the transfer ring 250 is moved into surrounding relation about the breaker-tread assembly, the transfer ring 250 is radially contracted so as to grasp the periphery of the exposed tread. Thereafter, the drum 130 is radially contracted. The degree of radial contraction of the drum 130 is only slight but is sufficient, however, to permit the transfer ring 250 to effect removal of the breaker-tread assembly, therefrom when the jacks 254 are retracted. Thereafter, the turret 252 is turned about its axis 256, such as by means of a jack 258, from the position wherein it is coaxially aligned with the drum 130 to a position in coaxial alignment with a first stage carcass support assembly 260.

The first stage carcass support assembly 260 includes a pair of shaping chucks 262 of the type, for example, disclosed in the aforementioned U.S. Pat. No. 3,676,262. The chucks 262 are coaxially arranged with one another for movement toward and away from one another. The chucks 262, when moved from a position illustrated in phantom in FIG. 1 to a position in close proximity with one another and illustrated in solid line in FIG. 1, act to engage respective ones of the opposite carcass beads and move the beads toward one another thereby changing the configuration of the first stage carcass from that of substantially cylindrical configuration to that of a toroid. During this period, the first stage carcass is inflated by a bladder assembly (not shown) and shaped by a pair of coaxially alignable carcass shaping rings, such as a ring 264 mounted on the first stage carcass support assembly 260 and a ring 266 mounted upon the turret 252. Upon inflation of the first stage carcass, the exterior of the latter will engage the interior of the breaker-tread assembly constrained within the confines of the transfer ring 250 and will adhere thereto. Thereafter, transfer ring 250 is removed from the vicinity of the chucks 262 and a conventional tread stitching mechanism 268 is actuated so as to stitch or effect adhesion of the breaker tread assembly to the first stage carcass.

Operatively associated with the aforementioned units A–F, is an electronic control system which is provided for controlling the operations of the machine of the present invention. In this respect, the electronic control system generally comprises a power supply of A.C. and D.C. nature, a programmable controller and a digital control system having various pulse-responsive counters and other associated equipment.

Generally speaking, the programmable controller acts to control the operative sequence of the machine. The programmable controller comprises various input means for receiving intelligence from sources such as push buttons, limit switches, contact closures, and associated digital and analog equipment, programmable decision making means in the form of a computer memory, and output means capable of energizing and de-energizing various solenoids, motor starters and relays which are associated either directly or indirectly with the digital and analog equipment. The programmable controller acts to recognize signals from push buttons to selectively start or interrupt various sequences, signals from limit switches which indicate various positions of the machine components, and signals from contact closures associated with the digital and analog equipment which indicate the status or condition of the motor drives and pulse counters, etc. The controller is programmed to make decisions depending upon the condition of the input intelligence thereto, and acts to selectively energize or de-energize the machine drives and prime movers as required by an associated software program. Preferably, the controller is of conventional nature and is of the type, for example, manufactured by the Reliance Electric Company in Cleveland, Ohio, and designated as a "Reliance Automate 33 Programmable Controller".

The operation of the tire building machine described and the associated electronic control system is more fully disclosed in copending U.S. Pat. application Ser. No. 329,786 filed on Feb. 5, 1973 in the name of William C. Habert et al.

Figure 2:
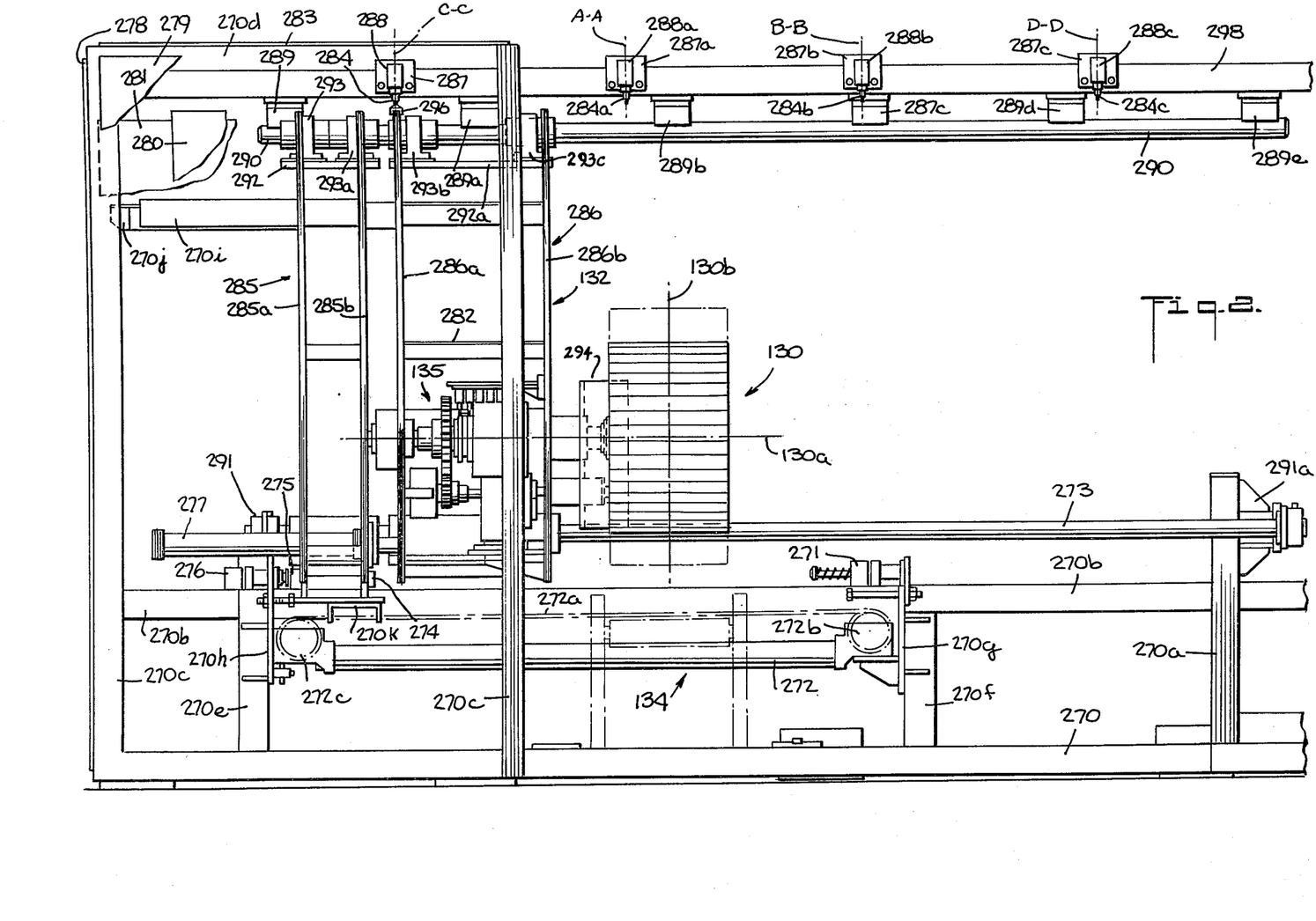
FIG. 2 is a partial schematic and cross-sectional view of the tire building drum portion of the tire building machine of FIG. 1.

Referring to FIGS. 2 and 3, the drum 130 is controlled axially by an axial drive assembly 134 and rotationally by an index drive assembly 135. The axial drive assembly 134 is mounted on a base frame 270. Base frame 270 include horizontally and vertically oriented supporting struts 270a–270b. Enveloping the four vertical supporting struts 270c is a protective end cover 278, side cover 279 and top cover 283, the end cover 278 and side cover 279 being partially removed in FIGS. 2 and 3 to show the features of the axial drive assembly 134 and index drive assembly 135. Extending vertically downwardly from horizontal supporting strut 270d is a plurality of spacer struts 289, 289a, 289b, 289c, 289d and 289e. Extending in a true horizontal and coaxial with the axis of rotation 130a of drum 130 and between the spacer struts is a first guide rod 290 for the suspension of the horizontally movable carriage 132. The movable carriage 132 includes a plurality of linear bearings 293, 293a, 293b, 293c, each having a respective partial cylindrical notch 295 which surrounds the first supporting guide rod 290. Vertically attached to linear bearing 293, 293a, is an auxiliary frame 285 and to linear bearing 293b, 293c, a main frame 286. Enveloping the auxiliary frame 285 and the main frame 286 is respective frame guard covers 280 and 281. Covers 280 and 281 telescope within each other such that cover 280 overlies cover 281. Auxiliary frame 285 includes frame members 285a and 285b, member 285a being attached at its upper end to linear bearing 293 and frame member 285b being attached at its upper end to linear bearing 293a. Main frame 286 includes frame members 286a and 286b, member 286a being attached at its upper end to linear bearing 293b and member 286b being attached at its upper end to linear bearing 293c. Located between linear bearings 293, 293a, and auxiliary frame members 285a, 285b, is a horizontally oriented auxiliary backing plate 292. Located between linear bearings 293b, 293c, and main frame members 286a, 286b, is a horizontally oriented main backing plate 292a. Attached to main frame 286 is a supporting strut 270i and attached to auxiliary frame 285 is supporting strut 270j. Struts 270i and 270j are coaxial with the axis of drum 130 and telescope within each other such that strut 270i overlies strut 270j.

The lower ends of auxiliary frame members 285a, 285b, and main frame members 286a, 286b, are attached to the horizontally movable piston of a first actuating means 277, such as a pressure cylinder. Upstanding from base frame 270 are struts 270a and 270e. Extending in a true horizontal and coaxial with the axis of rotation 130a of drum 130 and between struts 270a and 270e, by means of mounts 291 and 291a, is a second guide rod 273 for the support of the horizontally movable carriage 132. When fabricating the tire building machine of the present invention it is necessary to maintain the same vertical spacing between and along the entire length of the first and second guide rods 290 and 273. By maintaining the same vertical spacing, carriage 132 is able to freely move horizontally along rods 290 and 273 by means of the actuation of the first pressure cylinder 277. Carriage 132 therefore moves drum 130 horizontally in a direction parallel to the axis of rotation 130a. The thickness of backing plates 292 and 292a can be selected to ensure the free horizontal movement of auxiliary frame 285 and main frame 286.

Base frame 270 further includes upstanding struts 270e and 270f. Extending outwardly from struts 270e and 270f are respective mounting flanges 270g and 270h. Extending between mounting flanges 270g and 270h is a second actuating means 272 in the form of a pressure cylinder. Actuation of second pressure means 272 causes the rotation of endless cable 272a by and through pulleys 272b and 272c. Cable 272a is attached to one portion of a mounting plate 270k and auxiliary frame 285 is attached to a further portion of plate 270k. Actuation of the second pressure means 272 will cause Cable 272a to horizontally move mounting plate 270k and thereby horizontally move auxiliary frame 285 and main frame 286 along guide rods 273 and 290.

The limits of horizontal movement of auxiliary frame 285 and main frame 286 of carriage 132 is determined by the engagement of stop plates 274 and 275 with respective shock absorbers 271 and 276. As viewed in FIG. 2, carriage 132 is positioned such that stop plate 275 fully engages shock absorber 276; main frame guard 281 is telescoped within auxiliary frame guard 280; and supporting strut 270j is telescoped within supporting strut 270i.

Extending downwardly from supporting strut 270d is a bracket 298 for the mounting of limit switches 288, 288a, 288b and 288c. Attached to bracket 298 is a plurality of switch plates 287, 287a, 287b and 287c, upon which are mounted respective limit switches 288, 288a, 288b and 288c. Limit switches 288, 288a, 288b and 288c provide means through suitable electrical circuitry for determining the axial position of the drum 130 as established by the actuation of first and second pressure means 277 and 272. Limit switches 288, 288a, 288b and 288c are positioned along bracket 298 in locations corresponding to the lines C—C, A—A, B—B and D—D, respectively, as shown in FIG. 1. As noted above, line A—A and limit switch 288a represents and signals a position in which the center line 130b of drum 130 is coincident with the center-line of servicer wheel 28 for the application of a first breaker ply layer. Line B—B and limit switch 288b represents and signals a position in which the center-line 130b of drum 130 is coincident with the center-line of the tread applicator 200 for application of the tread. Line D—D and limit switch 288c represents and signals a position in which the center-line 130b of drum 130 is coincident with the center-line of the transfer 250 for the removal of the fabricated breaker-tread and subsequent application to the carcass. Actuation of limit switches 288, 288a, 288b and 288c is accomplished by the engagement of an actuator 296, mounted on the upper end of main frame member 286a, with respective limit switch cams 284, 284a, 284b and 284c. Actuation of limit switches 288, 288a, 288b and 288c occurs as carriage 132, and therefore drum 130, is horizontally moved along guide rods 273 and 290 by axial drive assembly 134.

Figure 4:
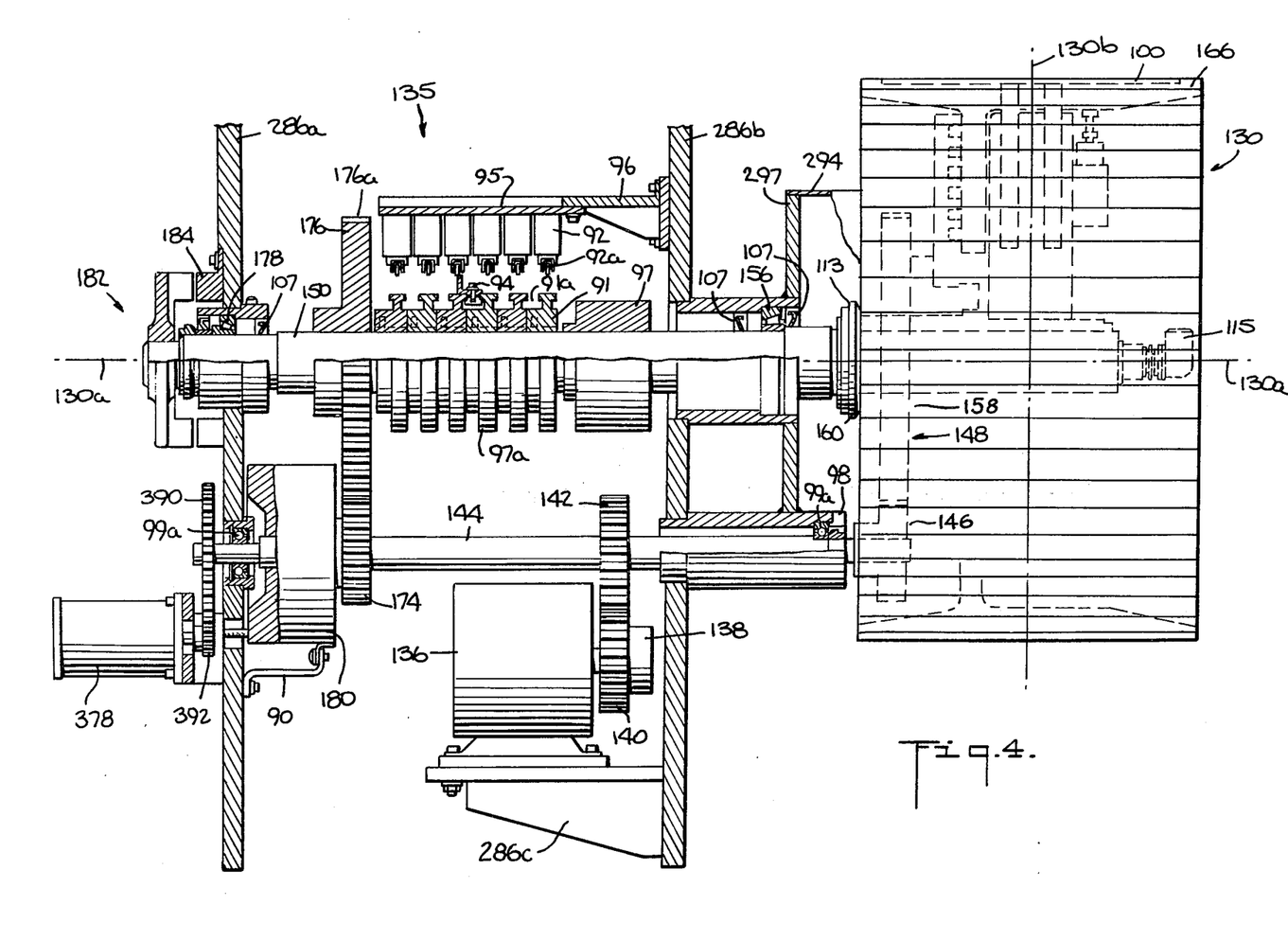
FIG. 4 is a partial schematic and cross-sectional view of the entire breaker building drum and drive assembly.

Drum 130 and index drive assembly 135 is attached to main frame members 286a and 286b, as more fully shown and described in FIG. 4. Carriage 132 further includes a protective cover 282 for a portion of the index drive assembly 135, the cover 282 being mounted between main frame members 286a and 286b.

Figure 5:
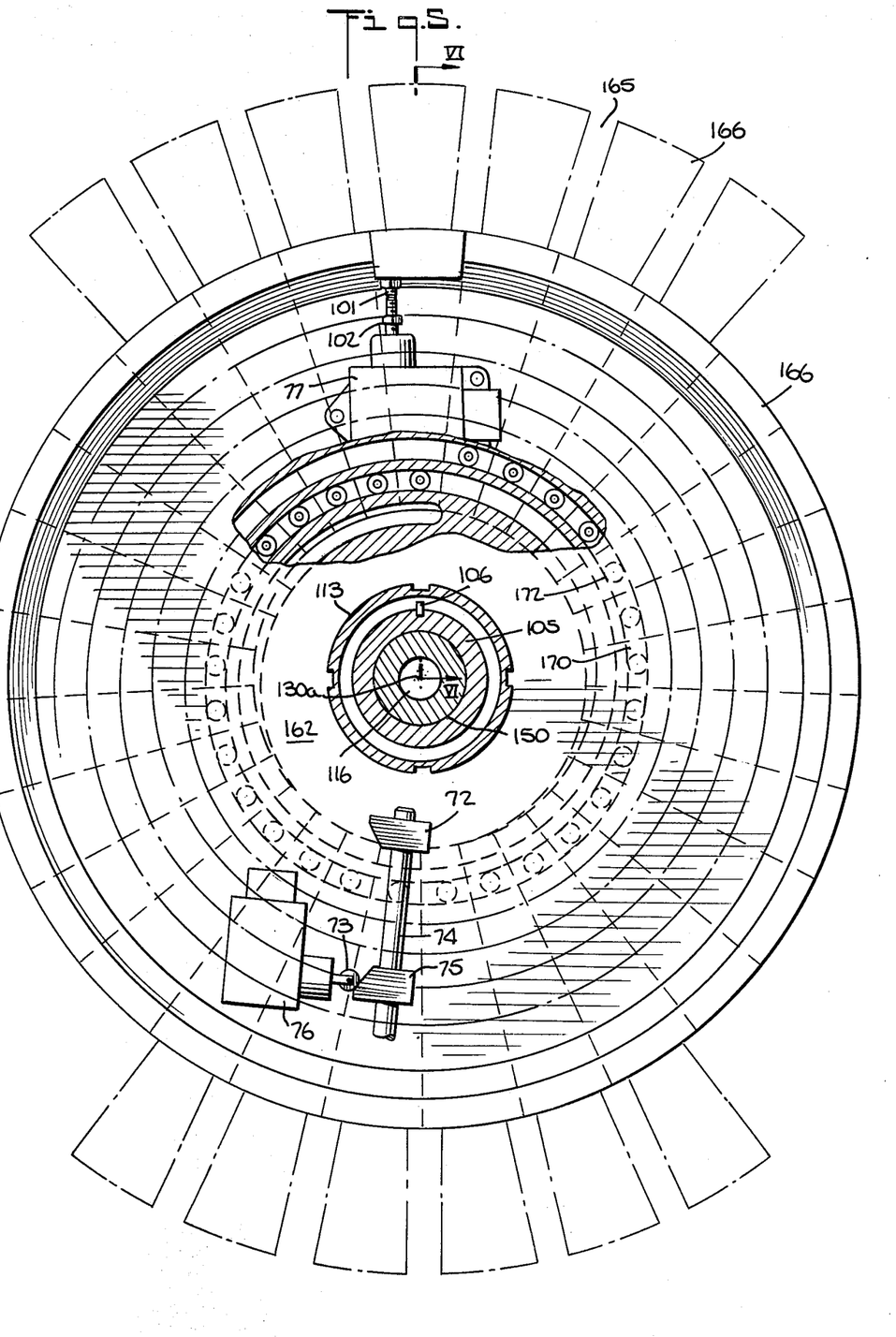
FIG. 5 is a partial schematic, fragmentary cross-section view of the interior of the breaker building drum.
Figure 6:
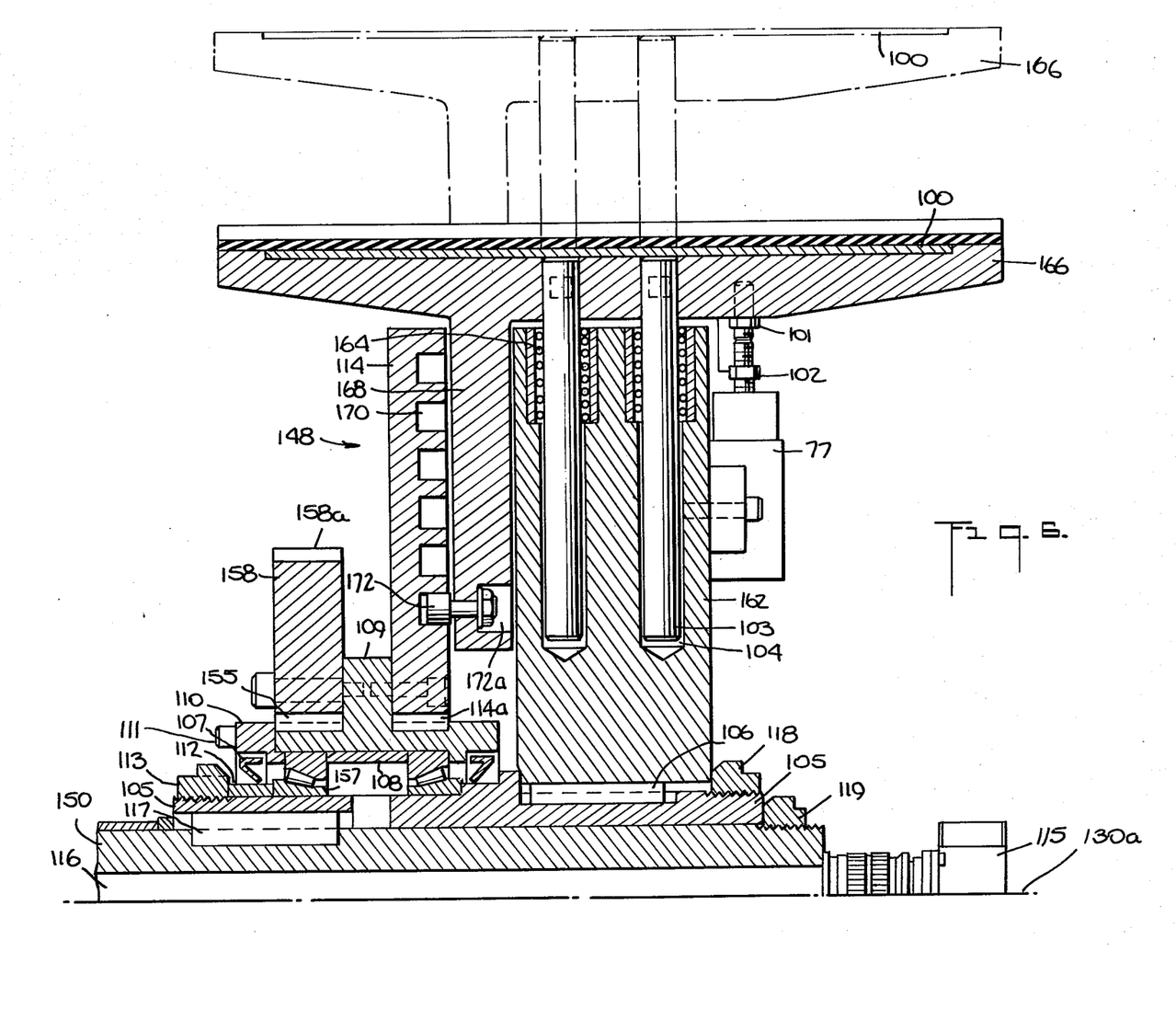
FIG. 6 is a partial schematic of another cross-sectional view of the breaker building drum taken along the line VI—VI of FIG. 5.
Figure 7:
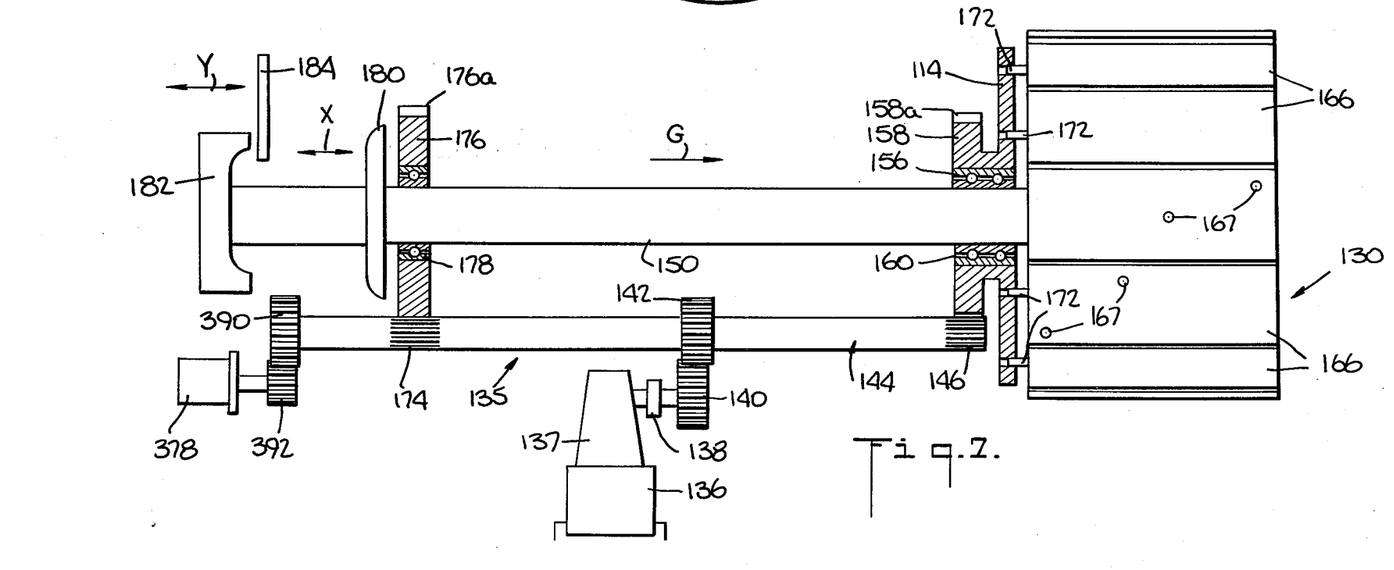
FIG. 7 is a simplified partial schematic cross-sectional elevational view of the breaker building drum and drive assembly useful for describing the functional

Referring in FIGS. 4, 5, 6, there is shown, in section, the index drive assembly 135 for controlling the rotational movement of the drum 130. Index drive assembly 135 provides the means for rotating drum 130 with or without radial expansion or contraction, i.e., with or without a change in the diametric dimension of the drum 130. The index drive assembly 135 is rigidly attached to main frame members 286a and 286b by suitable conventional means. Extending between frame members 286a and 286b is a drive shaft 144 and a drum support shaft 150. Drive shaft 144 is rotatably supported in frame member 286a by bearing 99 and in frame member 286b by bearing 99a and clamp ring 98. Rigidly attached to drive shaft 144 is a plurality of spaced gears, 390, 174, 142 and 146. Extending from frame member 286b is a motor flange 286c. Securely mounted on flange 286c is a reversible drive motor 136 having an output drive gear 140 and a first clutch 138. Output drive gear 140 engages drive shaft gear 142 through a gear reducer 137, as shown in FIG. 7.

Extending from frame member 286a is a clutch bracket 90. Rigidly attached to bracket 90 and surrounding drive shaft 144 is an electronically controlled second clutch 180. Adjacent second clutch 180 is a spur gear 174 having an axis of rotation which is coaxial with drive shaft 144. Second clutch 180 is selectively electronically programmed to cooperate with spur gear 174, to enable drum 130 to be rotated with or without radial movement of the circumferentially arranged arcuate segments 166.

Located at one end of drive shaft 144 is a gear 146 which cooperates with gear 158 of cam assembly 148 in rotating drum 130, as more fully described below with respect to FIG. 6. Located at the other end of drive shaft 144 is spur gear 390. Securely mounted to frame member 286a is an electronic pulse generator 378 having an output spur gear 392 which engages spur gear 390. Pulse generator 378 is a bi-directional digital tachometer and generates pulse feedback signals to the electronic control system, as the drive shaft 144 rotates, which pulses are indicative of the rotational position of drum 130. The electronic control system provides a reference pulse signal which actuates drive motor 136. As the drive shaft 144 rotates the feedback pulses generated by pulse generator 378 are effectively subtracted from the reference pulse signal driving motor 136. As the quantity of pulses approaches zero, the reference signal driving motor 136 is reduced and thereby slowing the rotation of drive shaft 144. Since drive shaft 144 controls both the radial movement of the segments 166 and the angular orientation of the drum 130, the drum 130 can be precisely positioned. In addition an electronically controlled brake (not shown) may be coupled to drive motor 136 for the purpose of stopping the latter at prescribed intervals.

Drum support shaft 150 is rotatably supported between frame members 286a and 286b by bearing assemblies 178 and 156, respectively. Drive shaft 144 and drum support shaft 150 are operatively rotatably connected by spur gear 176 on shaft 150 engaging spur gear 174 on shaft 144. Located securely at one end of support shaft 150 is a brake 182 which has a brake shoe 184. Brake 184 and brake shoe 182 cooperate with second clutch 180 in the rotational control of drum 130, to be described hereafter.

Located intermediate spur gear 176 and frame member 286b and extending from the latter is a switch bracket 95. Extending from bracket 95 is a switch mounting plate 96. Depending radially inward from plate 96 is a plurality of limit switches 92, each limit switch having a respective actuator cam 92a. Located between spur gear 176 and frame member 286b and on support shaft 150 is a limit switch actuator ring 91 having a plurality of circumferential slots 91a. Disposed in selected circumferential positions in slots 91a is an actuator mount 94 supporting an upstanding limit switch actuator 93. FIG. 4 shows representatively only one actuator mount 94 and actuator 93. The limit switches 92 are actuated by actuator 93 as drum support shaft 150 rotates with drum 130. Energizing of a selected limit switch provides an electrical signal indication to the electronic digital control system of the rotational position of the drum support shaft 150 and therefore drum 130.

Coaxially arranged about support shaft 150 is drum 130. Drum 130 comprises a plurality of arcuate segments 166 arranged to form the circumferential periphery of the drum. The peripheral surface of each of the segments has a magnetic strip 100. The magnetic strip 100 cooperates with wheel 28 in transferring the prepared cut-to-length metal-reinforced first breaker ply material from the wheel 28 to the drum 130. The peripheral surface of drum 130 also includes spot magnets 167 arranged at an angle corresponding to the bias angle of the metal-reinforcements in the breaker ply material. Spot magnets 167 assist in the positive lift-off of the leading edge of the prepared cut-to-length first breaker ply from wheel 28 and maintaining the leading edge on the drum 130 during application. Prior to application of the first (or the second) breaker ply. drum 130 is rotatably indexed so as to synchronously align the spots magnets 167 with the leading edge of the breaker ply on wheel 28. The desired rotational orientation of spot magnets 167 is detected by the energizing of a selected limit switch 92.

Spur gear 146, located at the end of the drive shaft 144, engages the tooth periphery 158a of spur gear 158 of cam assembly 148. Extending from frame member 286b is a gear flange 297 which supports a gear cover 294 for spur gear 158. Referring to FIGS. 5 and 6, spur gear 158 is coaxially arranged about shaft 150 on a portion of a cam hub 109 and prevented from rotating by spur gear key 155. Axially spaced from spur gear 158 and coaxially arranged about shaft 150 on a further portion of cam hub 109 is a cam plate 114 which is prevented from rotation by cam plate key 114a. Cam hub 109 is coaxially mounted for rotation about the axis of shaft 150 by a pair of bearing assemblies 157 which are spaced by a ring 108. Axially adjacent bearing assembly 157 is an lubrication seal 109. Similar lubrication seals 107 are located axially adjacent bearing assemblies 156 and 178, as shown in FIG. 4. A clamp screw ring 111 and a clamp ring 110 securely maintain spur gear 158 on cam hub 109. Arranged coaxially with shaft 150 is a shaft hub 105. A lock ring 113 engages the shaft hub 105 and, through a lubrication seal sleeve 112, secures cam hub 109 to shaft hub 105. A shaft key 117 is located between shaft 150 and shaft hub 105 to permit the latter to rotate with the shaft 150.

Axially spaced from cam plate 114 and coaxial with support shaft 150 is a drum inner ring 162. Inner ring 162 is attached to shaft hub 105 by a hub key 106 so as to permit the inner ring 162 to rotate with the shaft 150. Lock rings 118 and 119, respectively, secure the inner ring 162 to the shaft hub 105 and the shaft hub 105 to the support shaft 150.

Drum inner ring 162 includes two circumferential rows of a plurality of guide bores 104, only two of which are shown in FIG. 6. Slidably retained within each guide bore 104 by a bearing assembly 164 is a guide rod 103. One end of each guide rod 103 is securely attached to a respective one of segments 166. Extending radially from each segment 162 is a leg 168. Guide rods 103 and guide bores 104 are parallel to legs 168. At a slot 172a in the free end of each leg 162 is a cam follower 172. Each cam follower 172 is disposed in a continous spiral cam track 170 formed on the cam plate 114. The distance between each cam follower 172 and the peripheral surface of drum 130 varies since the cam track is a spiral and the drum is a uniform cylinder at all radial positions of the segments 166.

Securely connected to drum inner ring 162 are electrical limit switches 76 and 77. Limit switch 76 is adjusted to be energized when the drum 130 is at a minimum fully radially contracted condition. Limit switch 76 is further able to be energized when the drum is at a maximum fully radially expanded condition. Limit switch 77 is adjusted to be energized when the diametric dimension of drum 130 is at a reference value for the fabrication of breaker-tread assemblies. By way of example, when the drum 130 is at the minimum fully radially contracted condition, the diametric dimension is 19.82 inches. When the drum 130 is at the maximum fully radially expanded condition, the diametric dimension is 27 inches. When at the reference value the diametric dimension is 20.00 inches.

Limit switch 76 includes an actuating cam 73 which may be engaged by either of actuators 72 or 75. Actuator 72 will engage actuating cam 73 when the drum 130 is fully radially expanded. Actuator 75 will engage cam 73 when the drum 130 is fully radially contracted. Actuators 72 and 75 are adjustably attached to a mounting rod 74 affixed to one of the radially movable segments 166. As this segment radially moves, it will cause mounting rod 74 and actuator 72 and 75 to radially move.

Limit switch 77 includes an actuator cam (not shown) whose position can be adjusted and fixed by a lock nut 102. The actuator cam is engaged by an actuator affixed to a segment 166 and whose radial position is selected by an adjustment nut 101.

Located on support shaft 150 is a slip ring electrical connector 97. Slip ring connector 97 detects the actuation of either limit switch 76 or 77 as the segment 166 moves radially. Support shaft 150 contains an axial bore 116 which provides a passage for electrical wiring from slip ring connector 97 to an output electrical connector 115 located at one end of shaft 150. Electrical connector 115 is connected to the electronic digital control system.

Limit switch 77 establishes a reference value for the diametric dimension of the drum 130. Establishing a refrence value assists in the radial alignment of the segments 166 during initial starting of the tire building machine disclosed herein. A reference value also assists in setting the diametric dimension of the drum 130 at a known value in the event, for example, of malfunction in the tire building machine disclosed herein.

DESCRIPTION OF THE OPERATION

Figure 8:
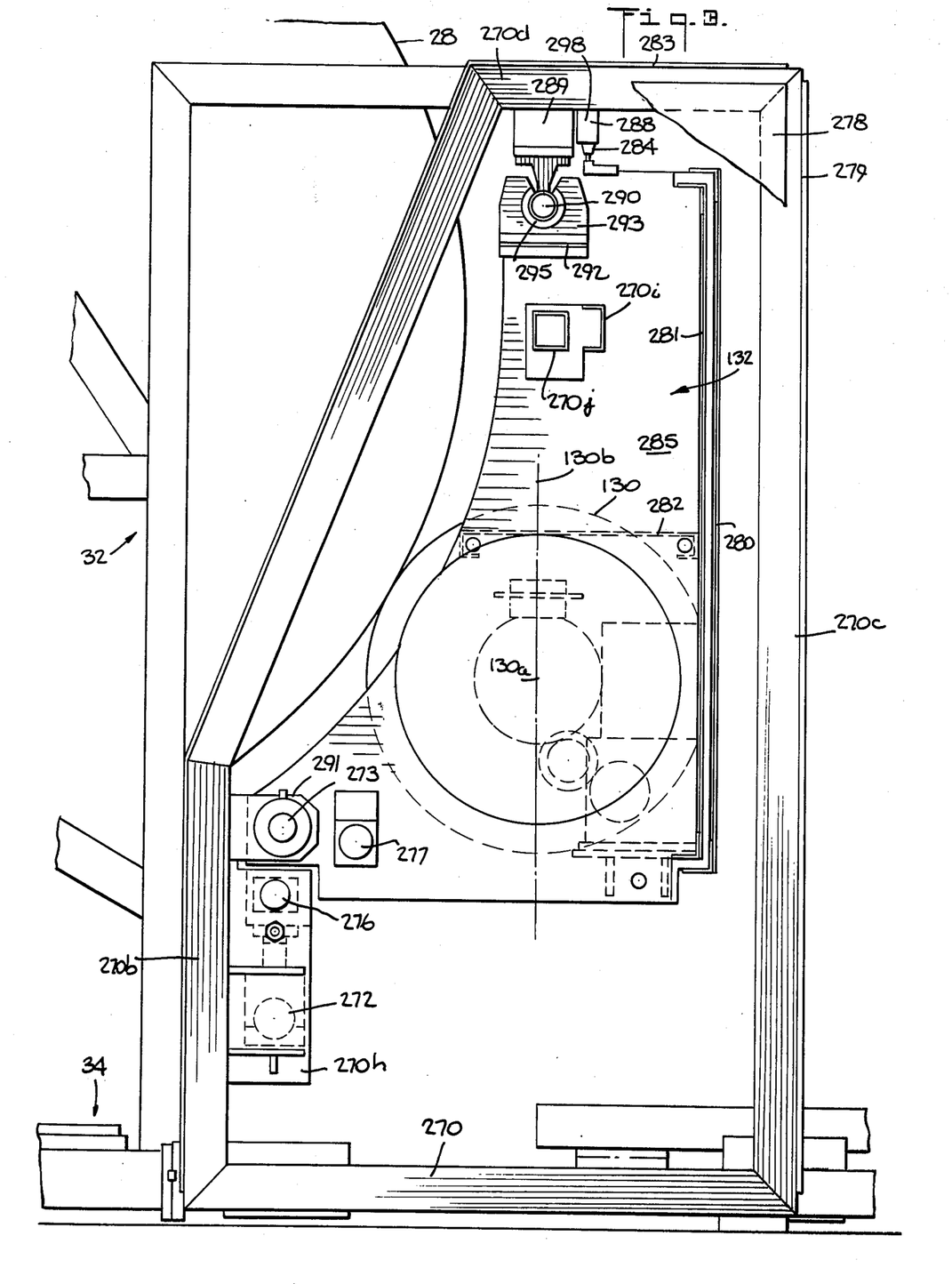
FIG. 8 is a simplified partial schematic and cross-sectional view of the radial expansion and breaker building contraction mechanism of the drum as viewed in the direction of the arrow G of FIG. 7.

As shown in FIGS. 1 and 3, adjacent the wheels 28 and 28' there is disposed a breaker-tread assembly building drum 130. Reference is made to FIGS. 7 and 8 for a simplified description of the operation of drum 130. In FIGS. 7 and 8 certain structural features are disposed in locations different from the locations shown in FIGS. 4 to 6. The difference shown in FIGS. 7 and 8 are solely for purposes of explanation as the function and operation of these structural features remain unchanged. The drum 130 is mounted upon a carriage 132 which is intermittently shiftable to effect axial movement of the drum 130 to and from positions defined by the reference median planes denoted by the lines A—A, B—B, C—C and D—D in FIG. 1. An appropriate axial drive assembly 134 is provided for shifting the carriage 132, and thereby the drum 130, to the intermittent positions aforementioned. An index drive assembly 135 is provided for radially expanding and contracting the drum 130 and for rotating the drum 130 during breaker fabrication. As best illustrated in FIGS. 7 and 8, associated with the drum 130 is a drive motor 136 having an output drive gear 140 coupled thereto through the intermediary of a conventional type of first clutch 138. Associated with the drive gear 140 is a driven gear 142 which is fixed upon a drum drive shaft 144 such that when the gear 142 is rotated the drum drive shaft 144 will be similarly rotated. The shaft 144 is provided with a gear 146 which intermeshes with a toothed periphery 158a gear 158 of cam assembly 148. The cam plate 114 of cam assembly 148 is freely journaled upon a drum support shaft 150 through the intermediary of a bearing assembly 156. The drum support shaft 150, thus, projects through an aperture 160 in the cam plate 114 and at one end is affixed to the inner ring 162 of drum 130.

The inner ring 162 is provided with a circumferential array of radially extending bearings 164 through which project, from the interior of the inner ring 162, legs 168 of respective periphery-defining segments 166. The cam plate 114 is provided with a substantially continuous spiral cam track 170 in which are slidingly constrained a cam follower 172 of the respective periphery-defining segments 166.

The drum drive shaft 144 is also provided with a toothed spur gear 174 with which is intermeshed the toothed periphery 176a of a spur gear 176. The gear 176 is freely journaled upon the drum support shaft 150 for rotation relative thereto through the intermediary of a bearing assembly 178. A second clutch 180 is provided for selectively coupling the drum support shaft 150 to the gear 176 and is controllably reciprocatable in the direction of arrow X into and out of engagement with a contacting surface of the gear 176. At the extreme left end of the drum support shaft 150 there is provided a brake 182 with which is associated a brake shoe 184 or the like, the latter being controllable reciprocatable in the direction of arrow Y into and out of engagement with a contacting surface of the brake 182.

Accordingly, when the drum drive shaft 144 is rotated by drive motor 136 through gears 140 and 142, it effects rotation of the cam assembly 148 through gears 146 and 158. When the brake shoe 184 is in engagement with the brake 182, the drum support shaft 150 will be prevented from rotating (the second clutch 180 in this instance being disengaged from gear 176). Rotation of the cam assembly 148, and thereby the spiral track 170, will effect radial movement of the periphery-defining segments 166 selectively toward or away from the axis of rotation of the drum wall 162. The direction of radial shift of the periphery-defining segments 166 depends upon the direction of rotation of the cam assembly 148 and, thus, the latter permits controlling the size of the circumference of the drum 130, i.e., the diametric dimension of the drum. Since the drum can have a range of drum diameters, e.g., 20 to 27 inches, the cam plate 114 can therefore be rotated at least one revolution or a plurality of revolutions to the selected desired diameter. At all radial positions of the segments 166, the drum maintains peripheral circumferential integrity since the drum is always a uniform cylinder.

When the brake shoe 184 is disengaged from the brake 182, and the second clutch 180 is brought into engagement with the gear 176, rotation of the drum drive shaft 144 will effect rotation of gear 176 by gear 174 and simultaneous rotation of the drum support shaft 150 and the cam assembly 148 by gears 146 and 158. Drum 130 is thereby rotated without effecting a change in the circumferential peripheral dimension or the diameter of the drum.

As shown in FIGS. 5 and 6, the full line represents the segments 166 fully radially contracted so as to have a continuous uninterrupted circumferential peripheral surface. The dashed line in FIGS. 5 and 6 represents the fully radially expanded position of segments 166 so as to have gaps 166 so as to have gaps 165 between adjacent segments.

During a transfer of a tread from the tread applicator 200 to the drum 130, the clutch 138 disposed between the drive gear 140 and the drive motor 136 of the drum 130 is operated so as to decouple the drive gear 140 from the drive motor 136. Brake 182 and second clutch 180 are also disengaged. This will permit the drum 130 to rotate freely about its support shaft 150 as the tread is applied.

Referring to FIG. 2, the starting position of carriage 132 and drum 130 is shown such that first and second pressure means 277 and 272 are retracted. The associated electronic control system will initiate the fabrication of the breaker-tread by actuating first pressure means 277. Carriage 132 and drum 130 is thereby horizontally moved along first and second guide rods 290 and 273 until actuator 296 engages cam 284a of limit switch 288a. Energizing of limit switch 288a signals the coincidence of the center-line of drum 130 with the center-line of servicer wheel 28 at line A—A and terminates the horizontal movement of carriage 132. Movement of carriage 132 permits auxiliary frame guard 280 to uncover main frame guard 281. After application of the first breaker layer, first pressure means 277 is actuated to the retracted position, telescoping auxiliary frame guard 280 over the main frame guard 281. Second pressure means 272 is actuated and cable 272a, through mounting plate 270k, horizontally advances carriage 132 and drum 130 until actuator 296 engages cam 284b of limit switch 288b. Energizing of limit switch 288b signals the coincidence of the center-line of drum 130 with the center-line of servicer wheel 28' at line B—B and terminates the horizontal movement of carriage 132. After application of the second breaker layer, second pressure means 272 is actuated to reverse the direction of cable 272a such that carriage 132 and drum 130 is horizontally moved to the position shown in FIG. 2. In FIG. 2, actuator 296 engages cam 284 of limit switch 288. Energizing of limit switch 288 signals the coincidence of the center-line of drum 130 with the center-line of the tread applicator 200 at line C—C. After application of the tread, first pressure means 277 is actuated to horizontally advance the carriage 132 and drum 130 until actuator 296 engages cam 284c of limit switch 288c. Energizing of limit switch 288c signals the coincidence of the center-line of drum 130 with the center-line of transfer ring 250. The index drive assembly 135 is actuated to radially contract the drum by rotating cam plate 114 to permit the transfer ring 250 to engage and remove the completed breaker-tread assembly. After removal and transfer of the breaker-tread assembly, second pressure means 272 is actuated to horizontally move carriage 132 and drum 130 to a position coincident with line A—A. In this return position, first pressure means 277 is extended and second pressure means 272 is retracted, thereby corresponding to the position for the initiation of the fabrication of the breaker-tread assembly.

It should be understood that the electronic control system may be programmed to horizontally advance out of the sequence of line A—A to line B—B to line C—C to line D—D to line A—A. Such out of sequence horizontal movements may be necessary for inspection and adjustment of the breaker tread building elements applied to drum 130. It should be further understood that the index drive assembly 135 may be programmed to rotate the drum 130 so as to radially position the spot magnets 167, the seam formed by the first or second breaker ply or the tread, respectively, in the desired angular orientation for subsequent tire building operations. It should be further understood that additional breaker or tread building elements may be incorporated into the breaker-tread assembly at any of the positions designated as lines A—A, B—B, C—C or D—D, or any other intermediate position.

It should be understood that the term "elastomeric", as used herein, refers to and is intended to include but not be limited to, natural and synthetic elastomerics, elastomeric blends, compositions and compounds. The term "cord", as used herein, refers to and is intended to include but not be limited to, single and multiple strand, filament, wire, cable and cord, whether twisted or untwisted and whether of natural or synthetic textile materials, such as cotton, rayon, nylon and polyester, or whether of glass or metal, or any combination thereof or any such other materials as may be used as reinforcements in the building of pneumatic tires. It should also be understood that although the description and embodiments disclosed herein are with respect to radial ply tires the invention is equally applicable to bias ply tires.

While particular embodiments of this invention have been shown and described, it will be obvious to those skilled in the art that various changes and modifications may be made without departing from this invention in its broader aspects, and it is, therefore, intended in the appended claims to cover all such changes and modifications as may fall within the true spirit and scope of this invention.

Having thus described my invention, what I claim and desire to protect by Letters Patent is:

1. A tire building drum for the building of a tire of a selected diameter from within a range of diameters comprising
   a plurality of arcuate segments forming the circumferential periphery of the drum, said arcuate segments being radially movable with respect to the longitudinal axis of rotation of the drum, each segment extending axially for the entire axial width of the drum, the segments being arranged circumferentially adjacent one another to form a substantially continuous rigid surface;
   and drive means for uniformly radially moving all the segments simultaneously to the selected diameter, said drive means comprising a cam means having a single continuous spiral operatively, connected with each segment, each segment having a radially inward extending leg of a different length and a cam follower engaging the spiral cam means at different radial locations in the spiral to maintain the segmented drum with a uniform circumference.

2. A tire building drum as claimed in claim 1 wherein said cam means includes a cam having a groove of continuous spiral extent in which a portion of a cam follower for each segment is slidably restrained.

3. A tire building drum as claimed in claim 1 wherein each leg has at the free end thereof a slot for receiving the cam follower.

4. A tire building drum as claim in claim 3 wherein each of said segments has a plurality of radially inward extending guide means, said guide means being parallel to the cam means.

5. A tire building drum as claimed in claim 1 wherein said drum has an inner wall and reference limit switch means attached to said wall for determining a reference diametric dimension of the drum segments when a selected segment actuates said refrence limit switch means.

6. A tire building drum as claimed in claim 1 wherein a limit switch means is attached to a selected segment, said switch means determining the maximum radial expansion and the minimum radial contracted position of the segments.

7. A tire building drum as claimed in claim 1 wherein said drive means comprises a drive shaft coaxial with the axis of the drum and connected to said cam means a drum support shaft coaxial and concentric with the axis of the drum; gear means operatively coupling the support shaft with the drive shaft; and a drive motor for actuating said drive shaft.

8. A tire building drum as claimed in claim 1 wherein said drive means includes means for rotating the drum without effecting radial movement of the segments.

9. A tire building drum as claimed in claim 8 wherein said drum rotating means comprises a drive shaft coaxial with the axis of the drum; a drum support shaft coaxial and concentric with the axis of the drum and connected to the drum; gear means operatively coupled to the support shaft; and a drive motor for actuating said drive shaft.

10. A tire building drum as claimed in claim 9 wherein said drum rotating means comprises clutch means for engaging the gear means, the actuating of said drive shaft by said drive motor effecting actuation of said gear means to effect actuation of said drum support shaft and said drum.

11. A tire building drum as claimed in claim 1 wherein said drive means includes means for effecting radial movement of said segments without effecting a rotation of the drum.

12. A tire building drum as claimed in claim 11 wherein said drive means comprises a drive shaft coaxial with the axis of the drum and connected to said cam means a drum support shaft coaxial and concentric with the axis of the drum; gear means operatively coupling the support shaft with the drive shaft; anad a drive motor for actuating said drive shaft.

13. A tire building drum as claimed in claim 12 wherein said radial movement means comprises a brake means for engaging the drum support shaft and preventing actuation of the support shaft, said drive motor effecting actuating of said drive shaft and said cam means.

14. A tire building drum as claimed in claim 1 comprising clutch means for decoupling the drive means from said drum.

15. A tire building drum as claimed in claim 1 wherein said drum includes electrical means for indicating the rotational position of the drum.

16. A tire building drum as claimed in claim 1 wherein said continuous spiral can be rotated a plurality of revolutions to vary the diameter of the drum.

17. A tire building drum as claimed in claim 1 wherein said continuous spiral can be rotated at least one revolution.

18. A tire building drum as claimed in claim 1 wherein the circumferential periphery of the drum is substantially maintained during radial movement of the segments and at any selected drum diameter.

19. A tire bulding drum as claimed in claim 1 wherein the continuous spiral cam means comprises a single cam plate.

20. A tire building drum as claimed in claim 2 wherein said groove is disposed in a single cam plate.

21. A tire building machine for building a tire of a selected diameter from within a range of diameters comprising means for supplying a breaker strip to an application means; means for transferring said strip from the application means to a breaker building drum, said drum having a plurality of arcuate segments forming the circumferential periphery of the drum, said arcuate segments being radially movable with respect to the longitudinal axis of rotation of the drum, each segment extending axially for the entire axial width of the drum, the segments being arranged circumferentially adjacent one another to form a substantially continuous rigid surface;

and drive means for uniformly radially moving all of the segments simultaneously to the selected diameter, said drive means comprising cam means having a single continuous spiral extent, each segment having a radially inward extending leg of a different length engaging the spiral cam means at different radial locations in the spiral to maintain the segmented drum with a uniform circumference.

22. A tire building machine as claimed in claim 21 wherein said cam means is operatively associated with a cam follower for each segment, the cam follower being slidably constrained in the spiral.

23. A tire building machine as claimed in claim 21 comprising drive means for moving said drum in a direction parallel to the axis of the drum.

24. A tire building machine as claimed in claim 23 wherein said axial drive means comprises carriage means for supporting said drum between axes spaced from each other and the drum axis; said carriage means being slidably supported by a frame of the machine and along said spaced axes; and means for slidably moving said carriage means on said frame.

25. A tire building machine as claimed in claim 24 wherein said supporting frame comprises guide rods spaced from and coaxial with the axis of the drum.

26. A tire building machine as claimed in claim 24 wherein said frame includes electrical means for indicating the axial position of the drum; said carriage means including actuating means for said axial position indicating means.

27. A tire building machine as claimed in claim 24 wherein the means for slidably moving said carriage comprises a first actuating means connected to said carriage for slidably moving said carriage on said supporting frame.

28. A tire building machine as claimed in claim 27 wherein the means for slidably moving said carriage comprises a second actuating means, said second actuating means comprising an endless cable operatively connected to the carriage.

29. A tire building machine as claimed in claim 21 wherein said continuous spiral can be rotated a plurality of revolutions to vary the diameter of the drum.

30. A tire building machine as claimed in claim 21 wherein said continuous spiral can be rotated at least one revolution.

31. A tire building machine as claimed in claim 21 wherein the circumferential periphery of the drum is substantially maintained during radial movement of the segments and at any selected drum diameter.

32. A tire building machine as claimed in claim 21 wherein the groove is disposed in a single cam plate.

* * * * *